US010740374B2

(12) United States Patent
Deng et al.

(10) Patent No.: US 10,740,374 B2
(45) Date of Patent: Aug. 11, 2020

(54) LOG-AIDED AUTOMATIC QUERY EXPANSION BASED ON MODEL MAPPING

(71) Applicant: International Business Machines Corporation, Armonk, NY (US)

(72) Inventors: Yu Deng, Westchester, NY (US); Rahul D. Sharnagat, Gondia (IN); Srikanth G. Tamilselvam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 15/198,058

(22) Filed: Jun. 30, 2016

(65) Prior Publication Data

US 2018/0004752 A1 Jan. 4, 2018

(51) Int. Cl.
*G06F 16/33* (2019.01)
*G06F 16/2457* (2019.01)
*G06F 16/93* (2019.01)
*G06N 3/04* (2006.01)
*G06F 17/27* (2006.01)

(52) U.S. Cl.
CPC .... *G06F 16/3347* (2019.01); *G06F 16/24578* (2019.01); *G06F 16/93* (2019.01); *G06F 17/27* (2013.01); *G06N 3/0472* (2013.01)

(58) Field of Classification Search
CPC .......... G06F 17/3053; G06F 17/30557; G06F 17/30528; G06F 16/24578; G06F 17/27; G06F 16/3347; G06F 16/93; G06F 17/2785; G06F 17/277; G06F 17/30873; G06F 17/30424; G06F 17/3087; G06F 17/30696;

(Continued)

(56) References Cited

U.S. PATENT DOCUMENTS 8,401,841 B2 3/2013 Roitblat et al.
9,043,248 B2 5/2015 Garg et al.
(Continued)

OTHER PUBLICATIONS

Word2Vec: https://code.google.com/p/word2vec/, Jul. 29, 2013.
(Continued)

*Primary Examiner* — James Trujillo
*Assistant Examiner* — Fatima P Mina
(74) *Attorney, Agent, or Firm* — Ryan, Mason & Lewis, LLP

(57) ABSTRACT

Methods, systems, and computer program products for log-aided automatic query expansion based on model mapping are provided herein. A computer-implemented method includes generating a vector representation for each of multiple words derived from historical user queries, wherein each of said vector representations is based on one or more system logs; generating a vector representation for each of multiple documents in a corpus of documents related to solutions to one or more hardware problems and/or one or more software problems; generating a vector representation for a user query based on the generated vector representation for each of the multiple words derived from the historical user queries; comparing the vector representation for the user query to the vector representation for each of multiple documents in the corpus; and determining one or more documents from the corpus to output in response to the user query based on said comparing.

11 Claims, 6 Drawing Sheets

(58) Field of Classification Search
CPC ........ G06F 17/30241; G06F 17/30867; G06N 3/0472
See application file for complete search history.

(56) References Cited

U.S. PATENT DOCUMENTS

| | | | |
|---|---|---|---|
| 9,916,377 B2 | 3/2018 | Bergs et al. | |
| 2010/0031095 A1 | 2/2010 | Ruan et al. | |
| 2010/0082333 A1 | 4/2010 | Al-Shammari | |
| 2011/0078133 A1* | 3/2011 | Bordawekar | G06F 17/30979 707/713 |
| 2011/0295897 A1* | 12/2011 | Gao | G06F 17/3064 707/780 |
| 2013/0086101 A1 | 4/2013 | Heidasch | |
| 2015/0052084 A1* | 2/2015 | Kolluru | G06T 13/40 706/11 |
| 2015/0095017 A1* | 4/2015 | Mnih | G06N 3/0454 704/9 |
| 2015/0324454 A1* | 11/2015 | Roberts | G06F 17/3053 707/734 |
| 2016/0247061 A1 | 8/2016 | Trask et al. | |
| 2017/0004184 A1* | 1/2017 | Jain | G06F 17/2735 |

OTHER PUBLICATIONS

Le et al., "Distributed Representations of Sentences and Documents," Proceedings of the 31 st International Conference on Machine Learning, Beijing, China, 2014. JMLR: W&CP vol. 32.

Mikolov et al., "Exploiting Similarities among Languages for Machine Translation," Sep. 2013.

Mikolov et al., "Linguistic Regularities in Continuous Space Word Representations," Proceedings of the 2013 Conference of the North American Chapter of the Association for Computational Linguistics: Human Language Technologies (NAACL-HLT-2013).

* cited by examiner

LOG-AIDED AUTOMATIC QUERY EXPANSION BASED ON MODEL MAPPING

FIELD

The present application generally relates to information technology, and, more particularly, to document searching techniques.

BACKGROUND

Queries submitted from end users in support services typically contain a limited amount of information pertaining to the symptoms of problematic hardware and/or software. Accordingly, it can be challenging for existing searching systems and approaches to retrieve relevant documents from a repository given a lack of specific details in such queries. Specific details that are commonly missing from such queries can include, for example, an error code and a detailed description of one or more problems.

SUMMARY

In one embodiment of the present invention, techniques for log-aided automatic query expansion based on model mapping are provided. An exemplary computer-implemented method can include generating a vector representation for each of multiple words derived from historical user queries, wherein each of said vector representations is based on one or more system logs, and generating a vector representation for each of multiple documents in a corpus of documents related to solutions to one or more hardware problems and/or one or more software problems. Such a method can also include generating a vector representation for a user query based on the generated vector representation for each of the multiple words derived from the historical user queries, comparing the vector representation for the user query to the vector representation for each of multiple documents in the corpus, and determining one or more documents from the corpus to output in response to the user query based on said comparing.

In another embodiment of the invention, an exemplary computer-implemented method can also include steps of transforming the vector representation for the user query to a space associated with the corpus by implementing a transformation function trained via the corpus, comparing the transformed vector representation for the user query to the vector representation for each of multiple documents in the corpus, ranking the documents from the corpus based on said comparing, and outputting one or more documents from the corpus in response to the user query based on said ranking.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes log-aided automatic query expansion based on model mapping. At least one embodiment of the invention includes using system logs to bridge a gap between queries and documents to improve search performance.

Log analytics include analyzing logs to identify potential issues and/or suggest fixes. Logs can include text (such as key terms, for example) that indicates one or more issues as well as corresponding time-stamps and/or related numerical information. Consequently, and as further described herein, at least one embodiment of the invention includes automating a process of using the text portion of logs to suggest documents that are most relevant in connection with a user query. For example, given a user query containing the terms "power/cooling sub-system unrecovered error," an example embodiment of the invention can include suggesting documents from multiple document types, such as, for example, past/previously resolved tickets, and/or configuration knowledge documents, so as to encompass various aspects of related log analytics.

Accordingly, as detailed herein, one or more embodiments of the invention can include utilizing system logs to match a user query with one or more relevant documents in a corpus. Such an embodiment can include generating vector representations for documents in the corpus along with vector representations of queries in a query log. Generating such vector representations is, as noted, based on knowledge documents and (error) logs, and is not dependent on user context. Such an embodiment can additionally include learning a transformation function to transform a query to document space to minimize the distance between the query and its solution document. Further, such an embodiment can also include utilizing a similarity function to identify the most relevant documents.

At least one embodiment of the invention can additionally include obtaining contextual information about a user on receiving a problem ticket (or query) from the user, and utilizing the obtained contextual information to refine the user query for finding documents that satisfies the user query. As further detailed herein, such an embodiment can also include identifying inaccurate and/or insufficient information associated with a customer/user problem ticket (or query) and dynamically collecting event data from a customer device/machine to identify additional information about the problem ticket.

Figure 1:
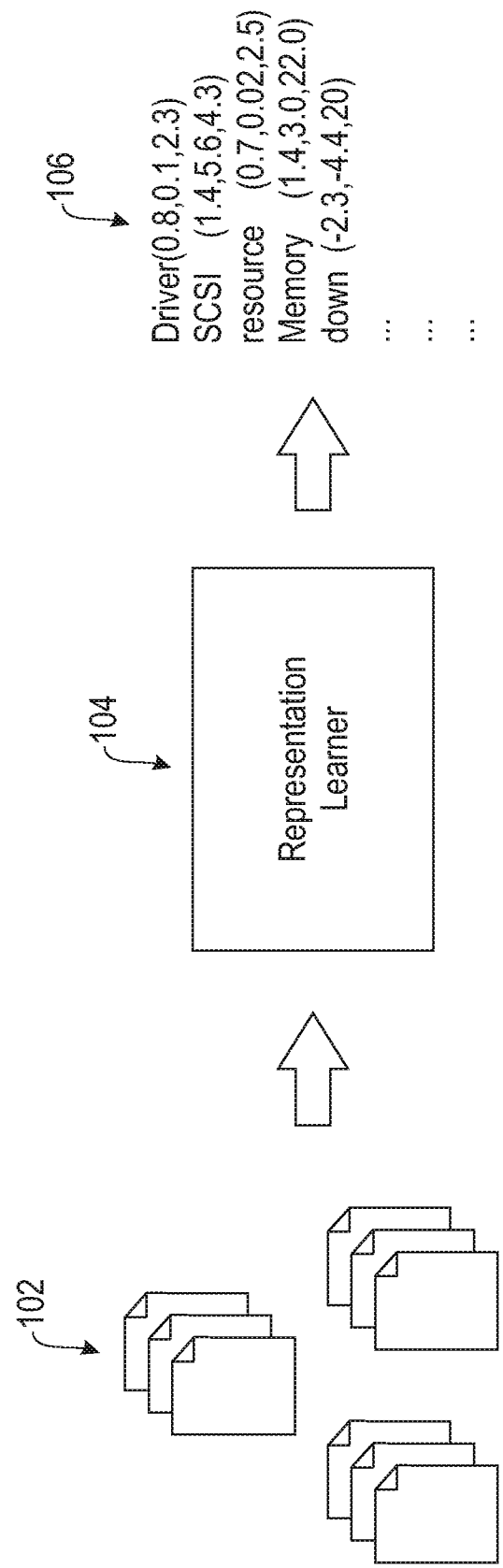
FIG. 1 is a diagram illustrating learning word vectors, according to an embodiment of the invention.

FIG. 1 is a diagram illustrating learning word vectors, according to an embodiment of the invention. By way of illustration, FIG. 1 depicts input 102 that includes a query log and a system log describing one or more symptoms. Such input 102 is provided to a representation learner component 104, which generates an output 106 that includes a vector representation for one or more words. The representation learner component 104 can be based, for example, on a neural probabilistic language model, such that the representation learner component 104 understands the context of given words and plots the words in an N-D space. As used herein, an N-D space refers to a multi-dimensional space wherein each dimension represents a certain learned latent attribute of a word.

In an example embodiment of the invention, the representation learner component 104 plots similar words closer to each other in N-D space (that is, closer to each other than non-similar words), wherein N is the vector size of the word representation. As used in this context, "similar words" refer to words that are semantically close to one another, wherein semantic similarity indicates that words that appear in a similar context have a similar semantic meaning. By way merely of example, the term "Impending-drive" and "Degraded-drive" will reside very close together in the N-D space in the corresponding representation.

In addition to learning word vectors, at least one embodiment of the invention includes generating a document vector for one or more documents in a given repository. A document vector, as further detailed herein, captures the semantics of the corresponding documents, and documents with similar content will reside close to one another (within the vector).

One or more embodiments of the invention also include creating a representation for the query. By way of illustration, consider the following: query q is composed of words $w_i$. In accordance with at least one embodiment of the invention, the words in the query q are enriched with case logs by expanding the initial user query (that is, by adding more logical terms to the input phrase so that the best results are returned as output). An example technique for carrying out such an action includes identifying the most frequent co-occurring word for the input query words. Additionally, in such an embodiment, the query q is represented as a weighted average of word vectors of the terms in the query:

$$q = \sum_i tfidf(w_i) * vec(w_i),$$

wherein vec(x) represents the word vector of word x, and wherein tfidf(x) represents the term frequency-inverse document frequency (tfidf) score of word x in the corpus.

Additionally, in one or more embodiments of the invention, the language of the query can be different than the language of the documents (in the repository), and/or the terms used to define the solution can be different than terms in the query. Accordingly, such an embodiment includes bridging the gap in such spaces (that is, the gap between the two languages and/or sets of terminology) by transforming the query from the symptom space to the solution space, wherein the symptoms are brought closer (semantically) to the solution.

As such, at least one embodiment of the invention includes implementing a transformation function. By way of illustration, consider the following: let $q_i$ represent a query vector and $D_i$ represent a document vector. One or more embodiments of the invention can include learning a transformation function W from a training corpus of $(q_i, D_i)$ in the following manner:

$$\underset{W}{\operatorname{argmin}} |W * q_i - D_i|.$$

In such a function, the distance between the transformed query and its corresponding solution document is minimized. Additionally, in at least one embodiment of the invention, a stochastic gradient descent method can be used to optimize the objective function. For example, a stochastic gradient descent can be applied on a training corpus of query logs to learn the relation between a query vector and a document vector. In such an embodiment, the stochastic gradient descent is an approximation to a gradient descent method. In essence, W captures a function to transform a query such that, in document space, the query will be closer to the solution document.

One or more embodiments of the invention can additionally include mapping and ranking documents. Given a new query, such an embodiment can include transforming the query using a learned transformation function W (such as detailed above). Once the query vectors are transformed to the document space, at least one embodiment of the invention includes measuring the similarity (for example, the cosine similarity) between the documents and the transformed query vector. Based on the measured similarity, the documents are ranked (prioritizing the most similar documents), wherein the ranked documents contain the solution for the symptoms mentioned in the query.

Figure 2:
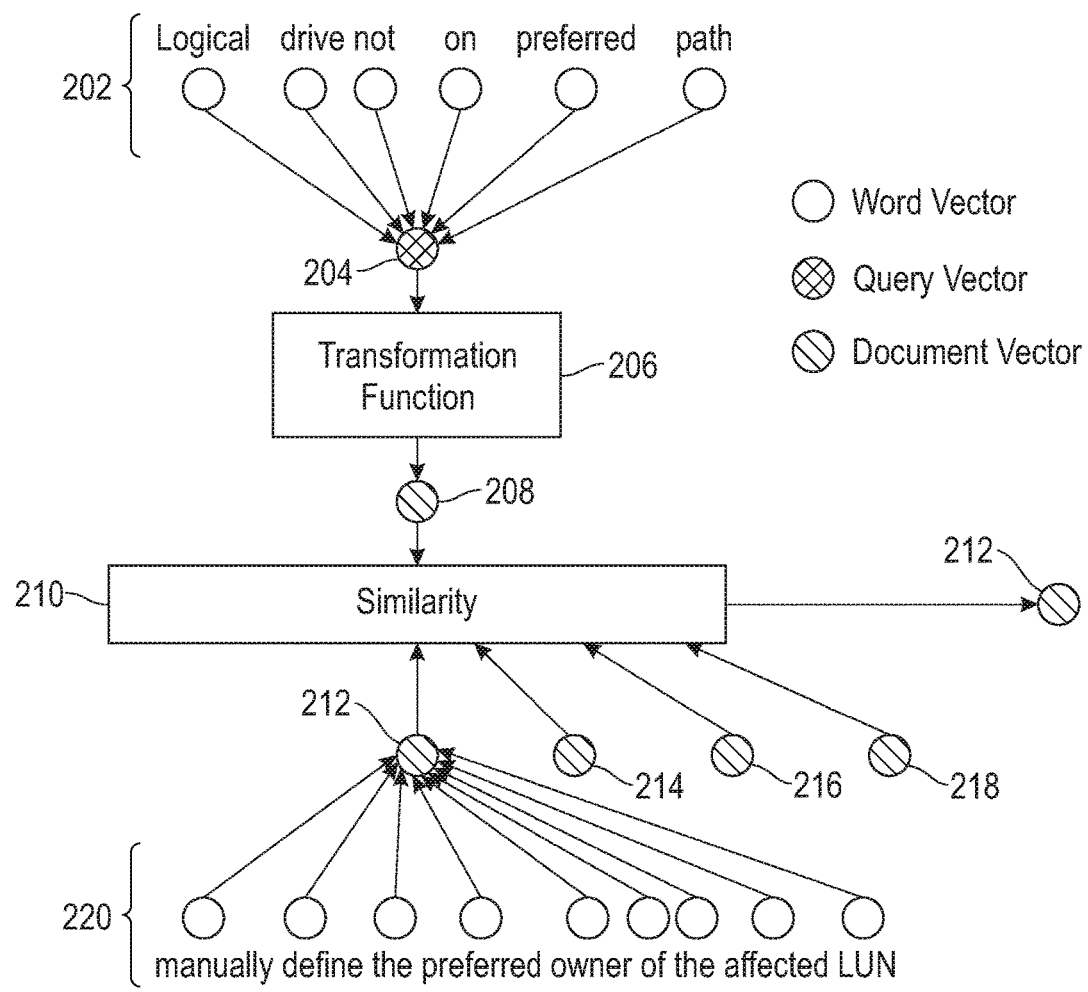
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts a tuple 202 that includes word vectors corresponding to a symptom ("Logical drive not on preferred path") noted in a query. Each of the word vectors in tuple 202 are used to generate a query vector 204 using a tfidf weighted sum of word vectors, which provides input to a transformation function component 206, which subsequently generates a document vector 208.

As also depicted, FIG. 2 includes a solution document 220 ("manually define the preferred owner of the affected LUN") that includes word vectors corresponding to the solution. The word vectors of the solution document 220 are used to generate a document vector 212, which, along with additional word vectors 214, 216 and 218, provides input to a similarity component 210, which determines the similarity (for example, the cosine similarity) between the provided document vectors (212, 214, 216 and 218) and document vector 208. The similarity component 210, in the depicted example of FIG. 2, determines that document vector 212 is the most similar document vector to document vector 208, and accordingly, the similarity component 210 outputs document vectors 212. Output document vectors 212 are the relevant document vectors for the query and are displayed to the user as relevant documents for the query.

Accordingly, as depicted in FIG. 2, one or more embodiments of the invention include learning one or more associations between the terms of a query and the terms of one or more potential solution documents. For example, such an embodiment can include creating a semantic representation of the query and the document(s), and creating associations (including word associations) after vector transformation. By way merely of example, such associations can include, for instance, "drive not on preferred path" mapping to "define preferred owner," and "logical drive" mapping to "LUN" (logical unit number).

Figure 3:
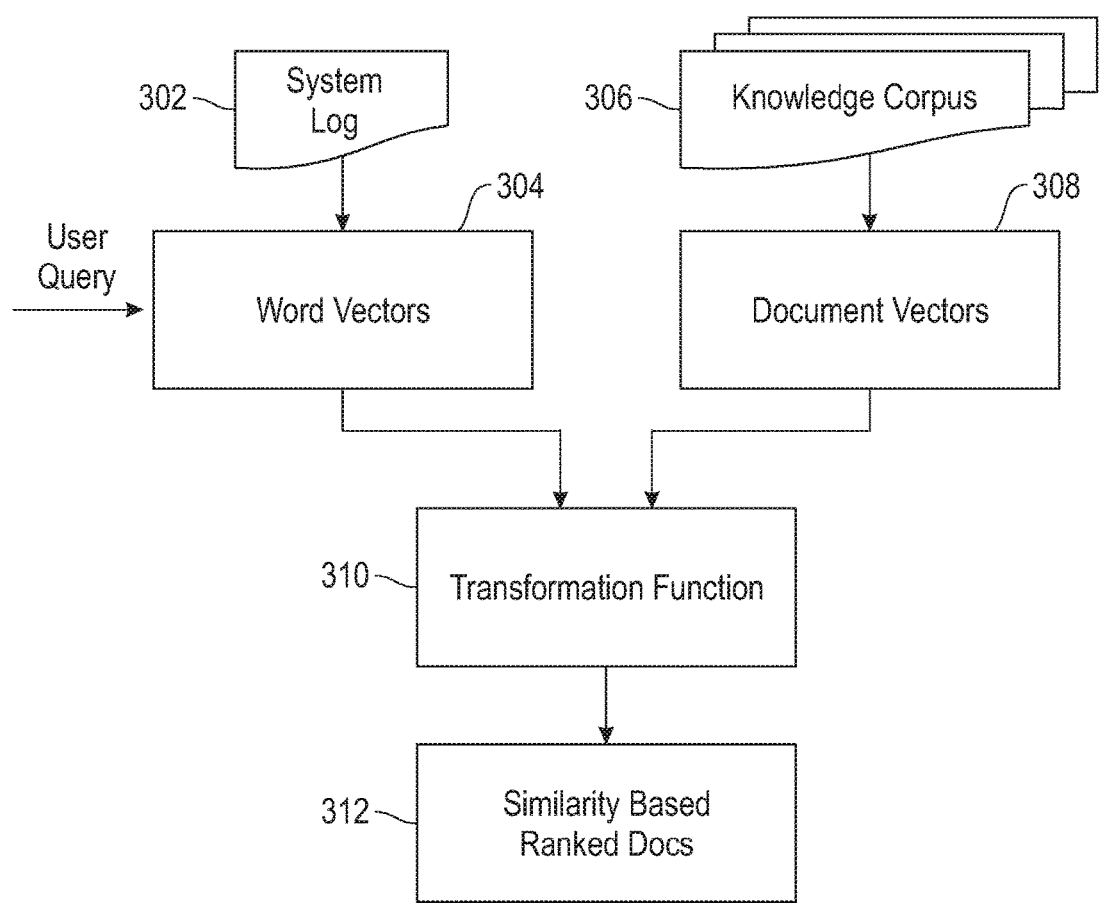
FIG. 3 is a diagram illustrating system architecture, according to an exemplary embodiment of the invention.

FIG. 3 is a diagram illustrating system architecture, according to an exemplary embodiment of the invention. By way of illustration, FIG. 3 depicts a word vector generation component 304, which receives input in the form of a user query as well as input from system logs 302. Additionally, FIG. 3 depicts a document vector generation component 308, which receives input from a corpus of knowledge and/or solution documents 306. The word vectors generated by component 304 and the document vectors generated by component 308 are provided to a transformation function component 310, which transforms the vectors and determines one or more associations therebetween, which are thereby used by similarity component 312 to rank the document vectors according to similarity to the word vectors derived from the user query.

Figure 4:
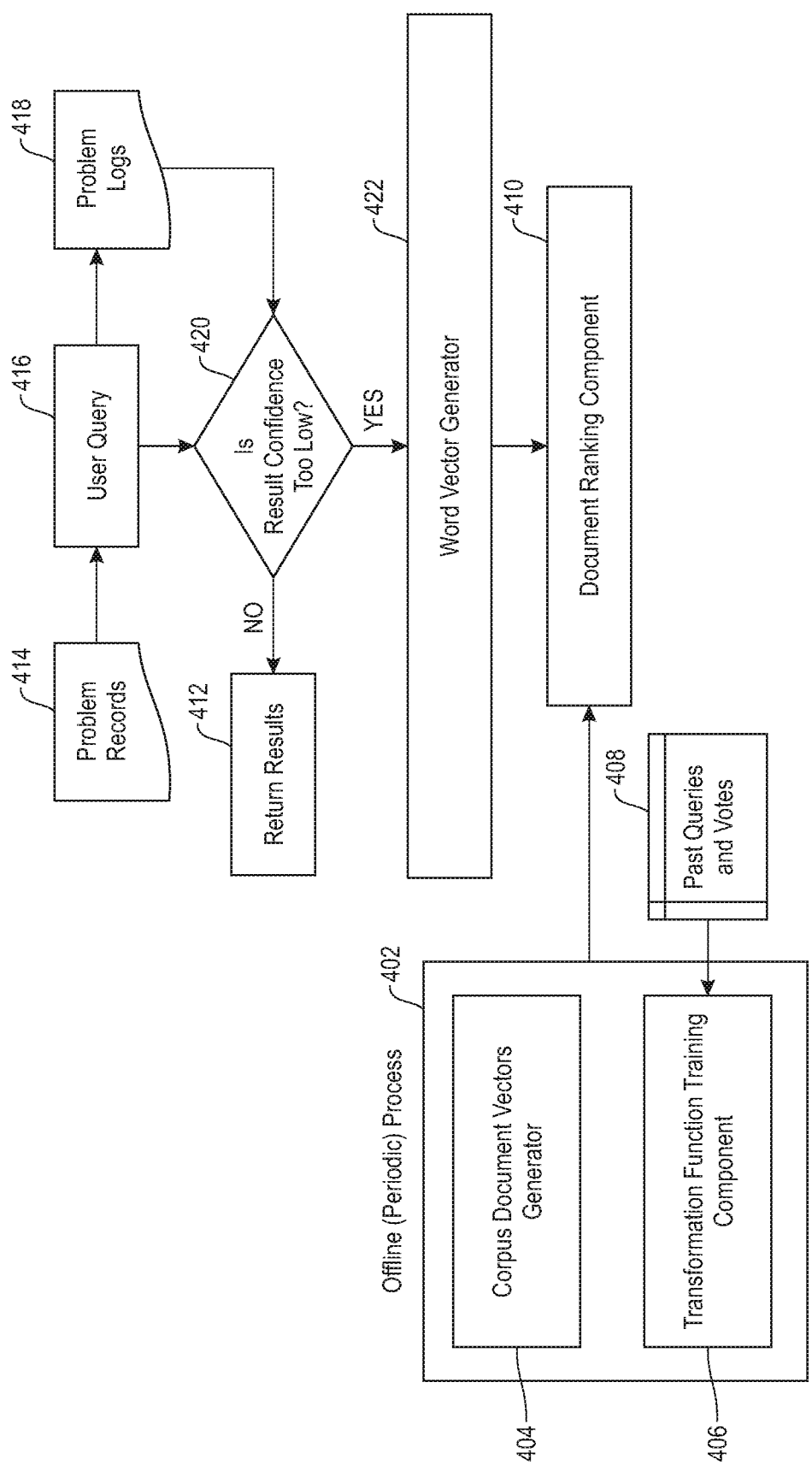
FIG. 4 is a flow diagram illustrating techniques according to an embodiment of the invention.

FIG. 4 is a flow diagram illustrating techniques according to an embodiment of the invention. By way of illustration, FIG. 4 depicts components of an offline (periodic) process 402 that include a corpus document vector generator 404 and a transformation function training component 406. The transformation function component 406, as depicted, receives input in the form of past user queries and votes 408. As used in this context, votes include user feedback for relevance of a result document for the query. A training corpus can contain pairs of query and voted documents, which can be used to learn a transformation function W using a gradient decent method based on the past user activity data 408.

As also depicted in FIG. 4, problem records 414 can be used to generate a user query 416 (which can also be expanded with its case logs for results), which is provided as input to a set of problem logs 418. In step 420, determinations are made as to whether the user query 416, both independent of and in conjunction with information from the problem logs 418, generates a result with a corresponding confidence level that is below a pre-determined threshold. If no (that is, the generated results have a confidence level that is above the pre-determined threshold), then the results 412 are returned and/or output (to the user). If yes (that is, the generated results have a confidence level that is below the pre-determined threshold), then the generated results are provided to a word vector generator 422.

The word vector generator 422 extracts words $w_i$ from the log files 418 corresponding to a given time window X, starting backwards from the latest entry in the log. In one or more embodiments of the invention, the word vector generator 422 focuses on error messages from the problem log files 418. Additionally, the word vector generator 422 can use a log parser to extract the words $w_i$ from the log files 418 and/or can write a parser plugin. Based on the extracted words, the word vector generator 422 generates a word vector for the user query 416.

The generated word vector for the query is then provided to document ranking component 410, which maps the generated word vector for the query to the document space using the learned transformation function W (learned via component 406 and provided by the offline process 402) in order to retrieve relevant documents from the corpus. In accordance with at least one embodiment of the invention, the document ranking component transforms the generated word vector for the query (via transformation function W), and uses the transformed vector to rank the top given number of documents from the corpus using, for example, a nearest neighbor algorithm such as a Euclidean distance measure.

Figure 5:
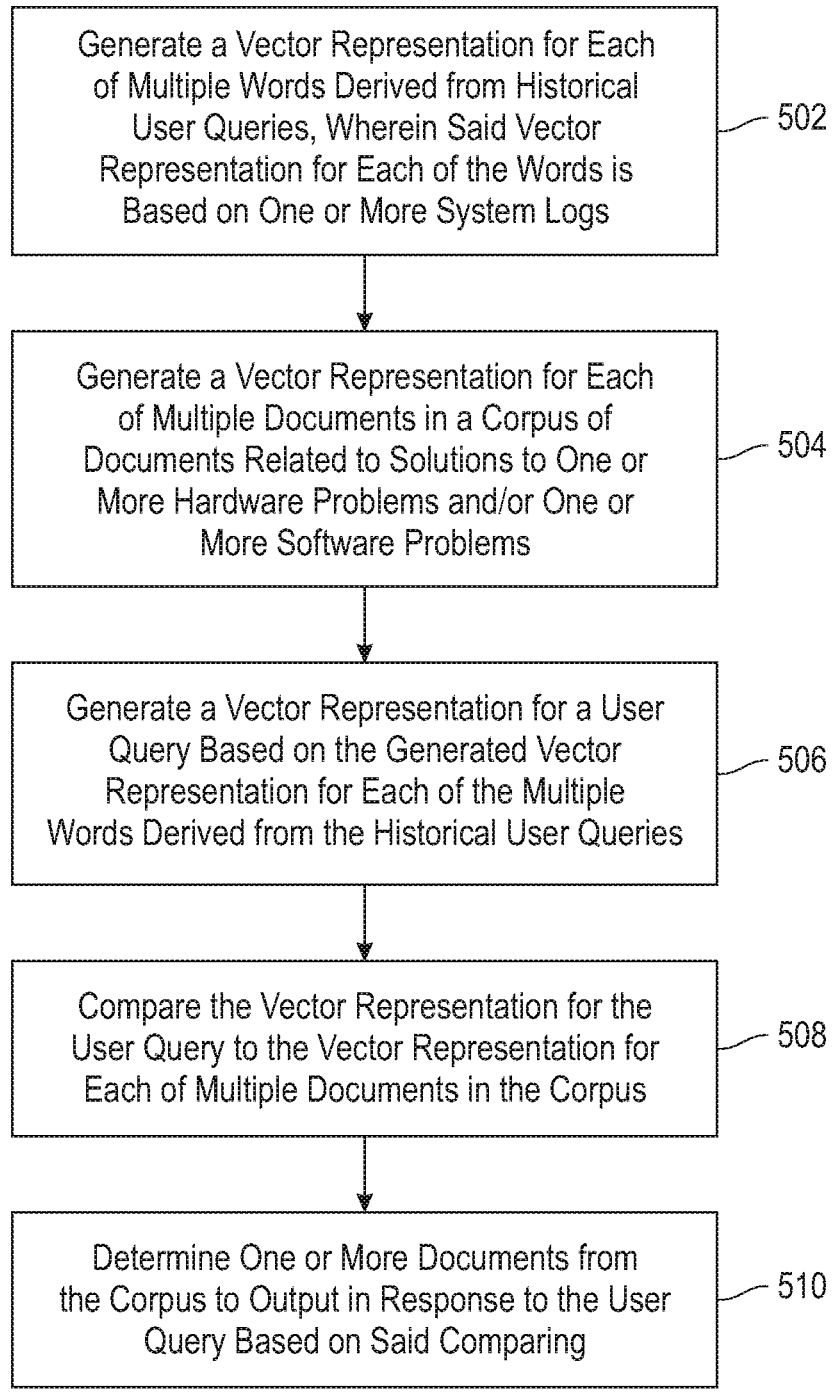
FIG. 5 is a flow diagram illustrating techniques according to an embodiment of the invention.

FIG. 5 is a flow diagram illustrating techniques according to an embodiment of the present invention. Step 502 includes generating a vector representation for each of multiple words derived from historical user queries, wherein said vector representation for each of the words is based on one or more system logs. Each of the one or more system logs can include a description of one or more symptoms related to a hardware problem and/or a software problem.

Also, generating the vector representation for each of the multiple words derived from the historical user queries can include implementing a neural probabilistic language model. Implementing the neural probabilistic language model can include (i) learning a context of each of the multiple words and (ii) plotting each of the multiple words in an N-D space, wherein plotting can include plotting words sharing a similar context closer in the N-D space to each other than words that do not share a similar context.

Step 504 includes generating a vector representation for each of multiple documents in a corpus of documents related to solutions to one or more hardware problems and/or one or more software problems. As detailed herein, the vector representation for each of the multiple documents captures the semantics of the corresponding document.

Step 506 includes generating a vector representation for a user query based on the generated vector representation for each of the multiple words derived from the historical user queries. Generating the vector representation for the user query can include computing a weighted average of the generated vector representations for the multiple words derived from the historical user queries.

Step 508 includes comparing the vector representation for the user query to the vector representation for each of multiple documents in the corpus. Comparing can include measuring a similarity between each of the multiple documents in the corpus and the vector representation for the user query.

Step 510 includes determining one or more documents from the corpus to output in response to the user query based on said comparing. Additionally, at least one embodiment of the invention can include ranking the documents from the corpus based on said comparing.

An additional embodiment of the invention can also include steps of transforming the vector representation for the user query to a space associated with the corpus by implementing a transformation function trained via the corpus, comparing the transformed vector representation for the user query to the vector representation for each of multiple documents in the corpus, ranking the documents from the corpus based on said comparing, and outputting one or more documents from the corpus in response to the user query based on said ranking. As detailed herein, such a transforming step can include implementing a stochastic gradient descent method.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor.

The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
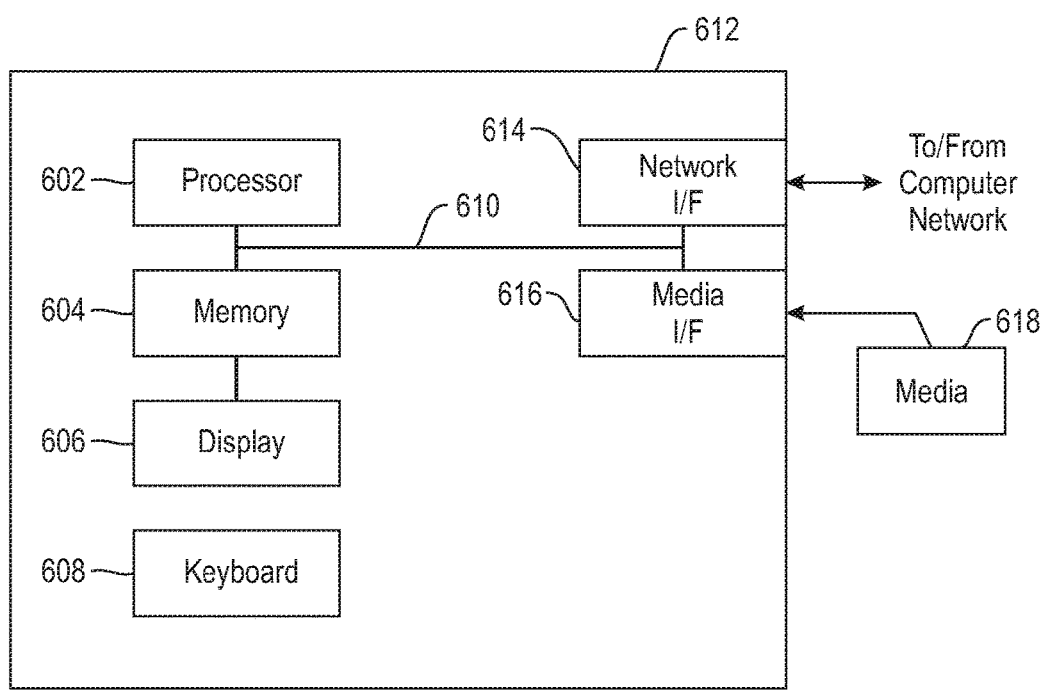
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, utilizing system logs to match a user query with relevant documents in a corpus for improving search performance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating a vector representation for each of multiple words derived from historical user queries, wherein each of said vector representations is based on one or more system logs, wherein said generating the vector representation for each of the multiple words derived from the historical user queries comprises implementing a neural probabilistic language model comprising (i) learning a context of each of the multiple words and (ii) plotting each of the multiple words in an N-D space;
   generating a vector representation for each of multiple documents in a corpus of documents related to solutions to one or more hardware problems and/or one or more software problems;
   generating a vector representation for a user query based on the generated vector representation for each of the multiple words derived from the historical user queries, wherein said generating the vector representation for the user query comprises computing a weighted average of the generated vector representations for the multiple words derived from the historical user queries;
   comparing the vector representation for the user query to the vector representation for each of multiple documents in the corpus, wherein said comparing comprises measuring a similarity between (i) each of the multiple documents in the corpus and (ii) the vector representation for the user Query; and
   determining one or more documents from the corpus to output in response to the user query based on said comparing;
   wherein the method is carried out by at least one computing device.

2. The computer-implemented method of claim 1, comprising:
ranking the documents from the corpus based on said comparing.

3. The computer-implemented method of claim 1, wherein each of the one or more system logs comprises a description of one or more symptoms related to a hardware problem and/or a software problem.

4. The computer-implemented method of claim 1, wherein said plotting comprises plotting words sharing a similar context closer in the N-D space to each other than words that do not share a similar context.

5. The computer-implemented method of claim 1, wherein the vector representation for each of the multiple documents captures the semantics of the corresponding document.

6. A computer program product comprising a computer readable storage medium having program instructions embodied therewith, the program instructions executable by a device to cause the device to:
generate a vector representation for each of multiple words derived from historical user queries, wherein each of said vector representations is based on one or more system logs, wherein said generating the vector representation for each of the multiple words derived from the historical user queries comprises implementing a neural probabilistic language model comprising (i) learning a context of each of the multiple words and (ii) plotting each of the multiple words in an N-D space;
generate a vector representation for each of multiple documents in a corpus of documents related to solutions to one or more hardware problems and/or one or more software problems;
generate a vector representation for a user query based on the generated vector representation for each of the multiple words derived from the historical user queries, wherein said generating the vector representation for the user query comprises computing a weighted average of the generated vector representations for the multiple words derived from the historical user queries;
compare the vector representation for the user query to the vector representation for each of multiple documents in the corpus, wherein said comparing comprises measuring a similarity between (i) each of the multiple documents in the corpus and (ii) the vector representation for the user query; and
determine one or more documents from the corpus to output in response to the user query based on said comparing.

7. The computer program product of claim 6, wherein each of the one or more system logs comprise a description of one or more symptoms related to a hardware problem and/or a software problem.

8. A system comprising: a memory; and
at least one processor coupled to the memory and configured for:
generating a vector representation for each of multiple words derived from historical user queries, wherein each of said vector representations is based on one or more system logs, wherein said generating the vector representation for each of the multiple words derived from the historical user queries comprises implementing a neural probabilistic language model comprising (i) learning a context of each of the multiple words and (ii) plotting each of the multiple words in an N-D space;
generating a vector representation for each of multiple documents in a corpus of documents related to solutions to one or more hardware problems and/or one or more software problems;
generating a vector representation for a user query based on the generated vector representation for each of the multiple words derived from the historical user queries, wherein said generating the vector representation for the user query comprises computing a weighted average of the generated vector representations for the multiple words derived from the historical user queries;
comparing the vector representation for the user query to the vector representation for each of multiple documents in the corpus, wherein said comparing comprises measuring a similarity between (i) each of the multiple documents in the corpus and (ii) the vector representation for the user query; and
determining one or more documents from the corpus to output in response to the user query based on said comparing.

9. A computer-implemented method, comprising:
generating a vector representation for each of multiple words derived from historical user queries, wherein each of said vector representations is based on one or more system logs, wherein said generating the vector representation for each of the multiple words derived from the historical user queries comprises implementing a neural probabilistic language model comprising (i) learning a context of each of the multiple words and (ii) plotting each of the multiple words in an N-D space;
generating a vector representation for each of multiple documents in a corpus of documents related to solutions to one or more hardware problems and/or one or more software problems;
generating a vector representation for a user query based on the generated vector representation for each of the multiple words derived from the historical user queries, wherein said generating the vector representation for the user query comprises computing a weighted average of the generated vector representations for the multiple words derived from the historical user queries;
transforming the vector representation for the user query to a space associated with the corpus by implementing a transformation function trained via the corpus;
comparing the transformed vector representation for the user query to the vector representation for each of multiple documents in the corpus wherein said comparing comprises measuring a similarity between (i) each of the multiple documents in the corpus and (ii) the vector representation for the user query;
ranking the documents from the corpus based on said comparing; and outputting one or more documents from the corpus in response to the user query based on said ranking;
wherein the method is carried out by at least one computing device.

10. The computer-implemented method of claim 9, wherein said transforming comprises implementing a stochastic gradient descent method.

11. The computer-implemented method of claim 9, wherein each of the one or more system logs comprise a description of one or more symptoms related to a hardware problem and/or a software problem.

\* \* \* \* \*